United States Patent [19]

Nagai et al.

[11] Patent Number: 4,742,395
[45] Date of Patent: May 3, 1988

[54] VIDEO CAMERA APPARATUS HAVING A SOLID-STATE IMAGE SENSOR AND A HIGH SHUTTER SPEED

[75] Inventors: Tadashi Nagai, Mino; Yukihiko Miyawaki, Kadoma, both of Japan

[73] Assignee: Matsushita Electric Industrial Co., Ltd., Kadoma, Japan

[21] Appl. No.: 831,443

[22] Filed: Feb. 20, 1986

[30] Foreign Application Priority Data

Feb. 20, 1985 [JP] Japan .................................. 60-30156
Nov. 2, 1985 [JP] Japan ................................ 60-246718

[51] Int. Cl.$^4$ .............................................. H04N 3/14
[52] U.S. Cl. ........................... 358/213.19; 358/213.26; 358/213.29
[58] Field of Search ...................... 358/212, 41, 213.13, 358/213.19, 213.29, 213.31, 213.27; 357/24 LR

[56] References Cited

U.S. PATENT DOCUMENTS

| | | | |
|---|---|---|---|
| 4,117,514 | 9/1978 | Terui et al. | 358/213 |
| 4,472,744 | 9/1984 | Inoue et al. | 358/213 |
| 4,564,766 | 1/1986 | Kuroda et al. | 357/24 LR |
| 4,573,078 | 2/1986 | Rentsch et al. | 357/24 LR |
| 4,597,013 | 6/1986 | Matsumoto | 358/213 |

Primary Examiner—Jin F. Ng
Assistant Examiner—Stephen Brinich
Attorney, Agent, or Firm—Wenderoth, Lind & Ponack

[57] ABSTRACT

A high shutter speed video camera has an objective lens and a CCD. The CCD is defined by a photosensor array for producing charge signals representing the image formed thereon by the lens, and a shift register for storing and moving the charge signals in a predetermined direction in response to drive pulses. A driver is provided for sequentially producing a first read pulse signal for effecting the transfer of the charge signals from the photosensor array to the shift register, high speed vertical drive pulses for moving the charge signals in the shift register at a high speed until all the charge signals are removed from the shift register, second read pulse signal for effecting the transfer of the charge signals from the photosensor array to the shift register, and normal speed vertical drive pulses for moving the charge signals in the shift register at a normal speed until the charge signals are removed from the shift register. Since the time interval between the first and second read pulse signals is selected to be very short, such as 1/1000 second, the image picked up by the CCD during this time interval is identical to an image picked up with a shutter speed of 1/1000.

9 Claims, 9 Drawing Sheets

VIDEO CAMERA APPARATUS HAVING A SOLID-STATE IMAGE SENSOR AND A HIGH SHUTTER SPEED

BACKGROUND OF THE INVENTION

1. Field of the invention

The present invention relates to a video camera apparatus which employs a solid-state image sensor, such as a CCD (charge coupled device) and, more particularly to a high shutter speed video camera which can clearly pick up the image of the object even when the object is moving at a high speed.

2. Description of the Prior Art

Recently, most of the video tape recorders have special replays, such as a still picture replay, a slow motion replay and a frame advance replay. To provide a high quality pictures even for such special replays, the image in each field should be clear, particularly when taking a video of an object which is moving at a high speed. To this end, a video camera which can take the picture of each field with a fast shutter speed should be used.

Figure 1:
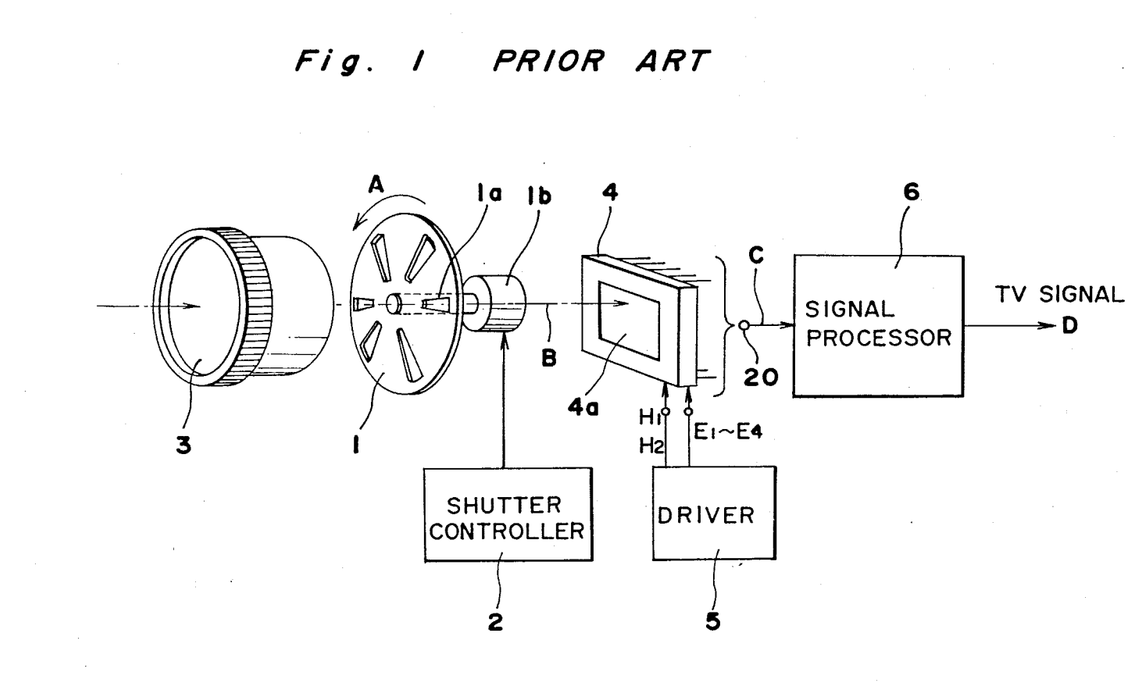
FIG. 1 is a diagrammatic view of a high shutter speed video camera according to the prior art.
Figure 2:
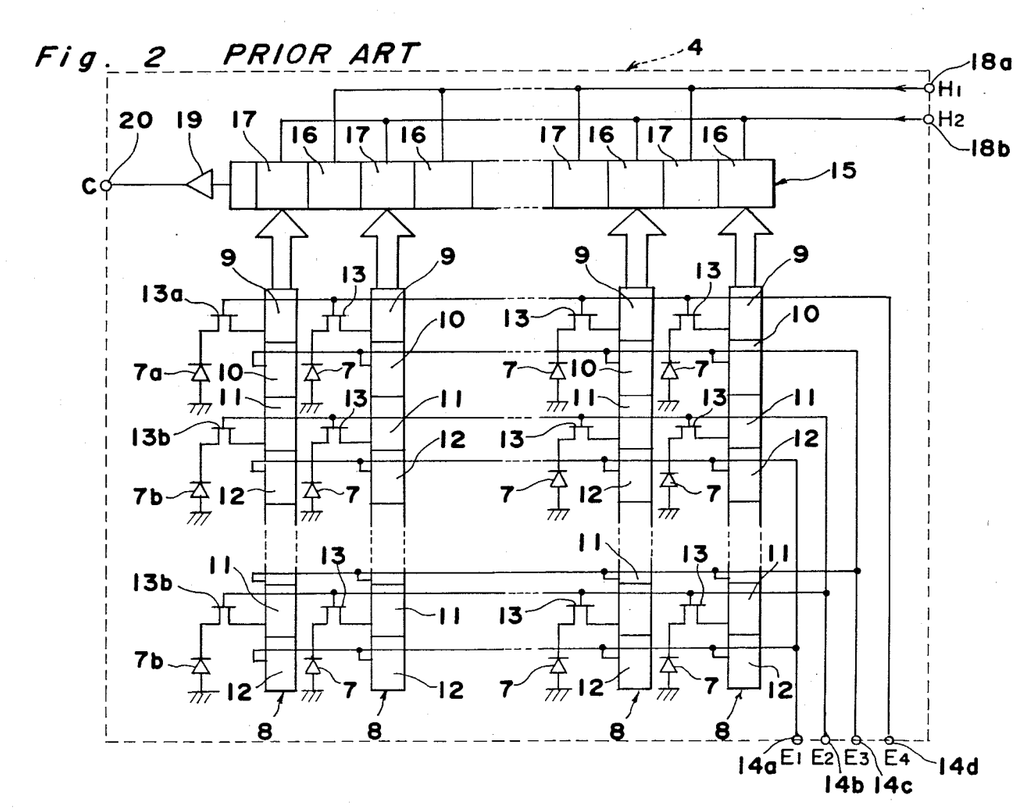
FIG. 2 is a circuit diagram of an IL-CCD used in the video camera of FIG. 1.

An example of prior art high shutter speed video camera is explained with reference to FIGS. 1–3. FIG. 1 diagrammatically shows a high shutter speed video camera which employs an interline charge coupled type solid-state image sensor (IL-CCD) 4 so positioned as to receive an image formed by an optical lens 3. A mechanical shutter 1, defined by a disc having slits 1a, is located in the optical path B between lens 3 and IL-CCD 4. The disc is rotated in the direction A by a motor 1b and its speed is controlled by a shutter controller 2, thus controlling the shutter speed. A driver 5 drives IL-CCD 4 and the image signal C produced from IL-CCD 4 is applied to a signal processor 6 which changes the image signal C to television signal D.

The prior art high shutter speed video camera operates as follows. First, the shutter speed is selected by shutter controller 2. Then, mechanical shutter 1 alternately opens and closes the optical path B at the selected shutter speed. When the mechanical shutter 1 is opened, the image which has passed through optical lens 3 is transmitted to IL-CCD 4, which then accumulates electric charges correspondingly to the brightness of the image, thereby producing the image signal C, which is converted to television signal D in the signal processor 6.

Next, the structure and the operation of IL-CCD 4 will be described in connection with FIGS. 2 and 3. A plurality of photodiodes 7 are aligned vertically and horizontally. Data transfer registers 8 are provided correspondingly to the columns of the photodiode arrays so as to vertically shift the data of accumulated charge in the photodiodes to a shift register 15, which is provided for scanning the data line by line. Each shift register 8 is defined by the repetition of cells 9, 10, 11 and 12 in which cells 9 and 11 are connected to photodiodes 7 through switching transistors 13. The gate structure of cells 9 and 11 are identical to each other, and the gate structure of cells 10 and 12 are identical to each other. The CCD is driven by signals E1, E2, E3 and E4 inputted to terminals 14a, 14b, 14c and 14d. A line for transmitting signal E4 is connected to transistor 13a and cell 9; a line for transmitting signal E3 is connected to cell 10; a line for transmitting signal E2 is connected to transistor 13b and cell 11; and a line for transmitting signal E1 is connected to cell 12.

Shift register 15 is defined by cells 16 and 17 aligned alternately and is driven by horizontal drive pulses H1 and H2 connected to cells 16 and 17, respectively. The output of shift register 15 is connected to a charge detector 19, which changes the charge signal to voltage signal. Usually, the charge detector is defined by a floating diffusion amplifier. The charge detector produces the image signal C which is outputted from terminal 20.

Figure 3:
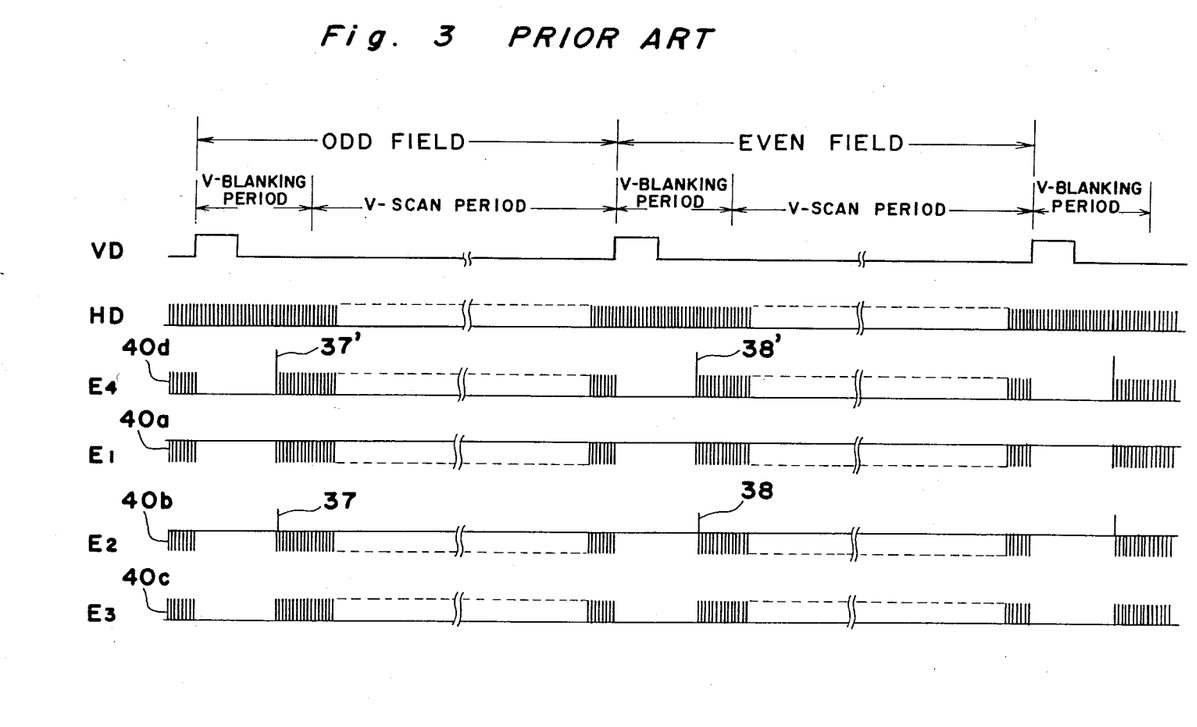
FIG. 3 is a graph of waveforms showing the operation of the IL-CCD of FIG. 2.

As shown in FIG. 3, signal E4 takes three different levels, the zero or reference level, the high level as in vertical drive pulses 40d, and the extra-high level as in read pulses 37' and 38'. By the extra-high level read pulse 37' or 38', transistor 13a turns on to move the charge accumulated in photodiode 7a to cell 9, thereby reading the image data in photodiodes 7 to registers 8. Then, by the high level V-drive pulse 40d, the data stored in cell 10 is shifted in the vertical direction to cell 9.

Signal E1 takes two levels, the reference level and the low level as in negative going V-drive pulses 40a, which effects the transfer of data to cell 12 from the cell behind it, i.e., cell 9.

Signal E2 takes three levels, the reference level, the high level and the low level. By the high level read pulse 37 or 38, transistor 13b turns on to move the charge accumulated in photodiode 7b to cell 11, and by the negative going V-drive pulses 40b, the data stored in cell 12 is shifted to cell 11.

Signal E3 takes two level, the reference level and the high level as in V-drive pulses 40c. By the V-drive pulses 40c, the data stored in cell 11 is shifted to cell 10.

From the practical viewpoint, the reference levels of signals E1 and E2 and the high levels of signals E3 and E4 are set at the same level.

It is to be noted that the pulses are produced for example, in the order of 40c, 40a, 40d and 40b so as to shift the data smoothly.

In operation, photodiodes 7 in the CCD receive an image, which is formed by lens 3 and has been passed through slit 1a. Since slit 1a moves across the CCD very fast, the CCD surface is exposed at a high shutter speed determined by the speed of rotation of the disc. Thus, even when the object is moving fast, the image can be captured at the very short time. Thus, there will be no, or very small, movement of the object effected during the image being impinged on the CCD, thereby resulting in a clear and sharp image formed on the CCD. Then, in response to pulses 37 and 37' (FIG. 3), switching transistors 13 conduct to transfer the charges accumulated in photodiodes 7 to the corresponding cells 9 and 11. Then, by the first four pulses 40a, 40b, 40c and 40d, applied at terminals 14a, 14b, 14c and 14d, respectively, the image stored in the shift registers 8 is shifted towards shift register 15 by one line, and at the same time, the image data stored in the first line cells 9 are shifted to shift register 15. Then, before the second four pulses 40a, 40b, 40c and 40d are applied, H-drive pulses H1 and H2 of high frequency are applied to terminals 18a and 18b to scan the line data completely through charge detector 19, thereby making register 15 empty. Then, when the second four pulses 40a, 40b, 40c and 40d are applied, the image stored in the shift register 8 is shifted towards shift register 15 by one line, and the image data stored in the first line cells 9 are shift to shift register 15. This operation is repeated by the number of rows (for example 525 rows) of photodiodes aligned in the CCD, i.e., until all the image data stored in the shift register 8 has been moved to and scanned out from shift register 15. In this manner, image signal C for one field is produced serially from terminal 20.

Therefore, in the prior art high shutter speed video camera described above, the charges accumulated in photodiodes 7 in the vertical scan period (V-scan period) in one odd field are shifted to shift registers 8 and are serially produced from terminal 20 in the V-scan period of the following even field. Also, because the shutter mechanism is provided, the image of the object is formed on photodiodes 7 only a very short time within V-scan period, resulting in a sharp and clear image, even when the object is moving fast.

According to the prior art high shutter speed video camera described above, since mechanical shutter 1 is provided, the camera body is bulky and heavy. Also, since motor 1b must be precisely adjusted, the camera requires a high manufacturing cost.

SUMMARY OF THE INVENTION

The present invention has been developed with a view to substantially solving the above described disadvantages and has for its essential object to provide an improved high shutter speed video camera which can be assembled without using the mechanical shutter.

It is also an essential object of the present invention to provide an image high shutter speed video camera of the above described type which is light and compact in size and can readily be manufactured at low cost.

In accomplishing these and other objects, a high shutter speed video camera according to the present invention comprises a driver for driving the CCD in two different speeds is provided. The driver sequentially produces a first read pulse signal for effecting the transfer of the charge signals from the photosensor array to the shift register in the CCD, high speed vertical drive pulses for moving the charge signals in the shift register at a high speed until all the charge signals are removed from the shift register, second read pulse signal for effecting the transfer of the charge signals from the photosensor array to the shift register, and normal speed vertical drive pulses for moving the charge signals in the shift register at a normal speed until the charge signals are removed from the shift register. Since the time interval between the first and second read pulse signals is selected to be very short, such as 1/1000 second, the image picked up by the CCD during this time interval is identical to an image picked up with a shutter speed of 1/1000.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 4:
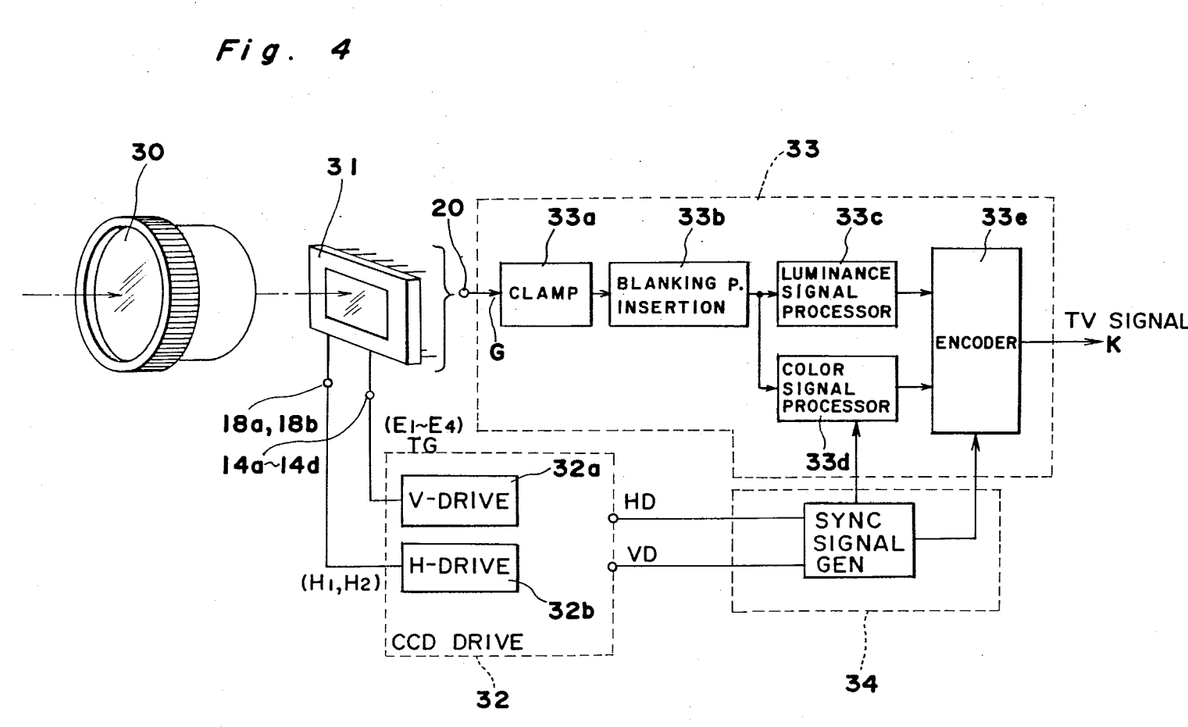
FIG. 4 is a diagrammatic view of a high shutter speed video camera according to the present invention.

Referring to FIG. 4, the high shutter speed video camera according to the present invention comprises an optical objective lens 30 and an IL-CCD 31 of a similar kind described above in connection with FIG. 1. There is no mechanical shutter provided between the lens and the CCD, or at any other place. The IL-CCD 31 is driven by a CCD driver 32 which has vertical drive circuit 32a and horizontal drive circuit 32b. The detail of CCD driver 32 will be described later in connection with FIG. 6.

The CCD produces from its terminal 20 an image signal G which is applied to a signal processing circuit 33 which comprises: a clamp circuit 33a for clamping the dark current portion in the image signal G to predetermined voltage; a blanking pulse insertion circuit 33b connected to clamp circuit 33a for inserting a blanking pulse during the blanking period to eliminate any noise signals in that period thereby preventing any interferences by the noise signal; luminance signal processor 33c and color signal processor 33d which receive signal from blanking pulse insertion circuit 33b; and encoder 33e which produces a television signal K. The operations of the circuits in signal processing circuit 33 are controlled by pulses produces from sync signal generator 34.

Figure 5:
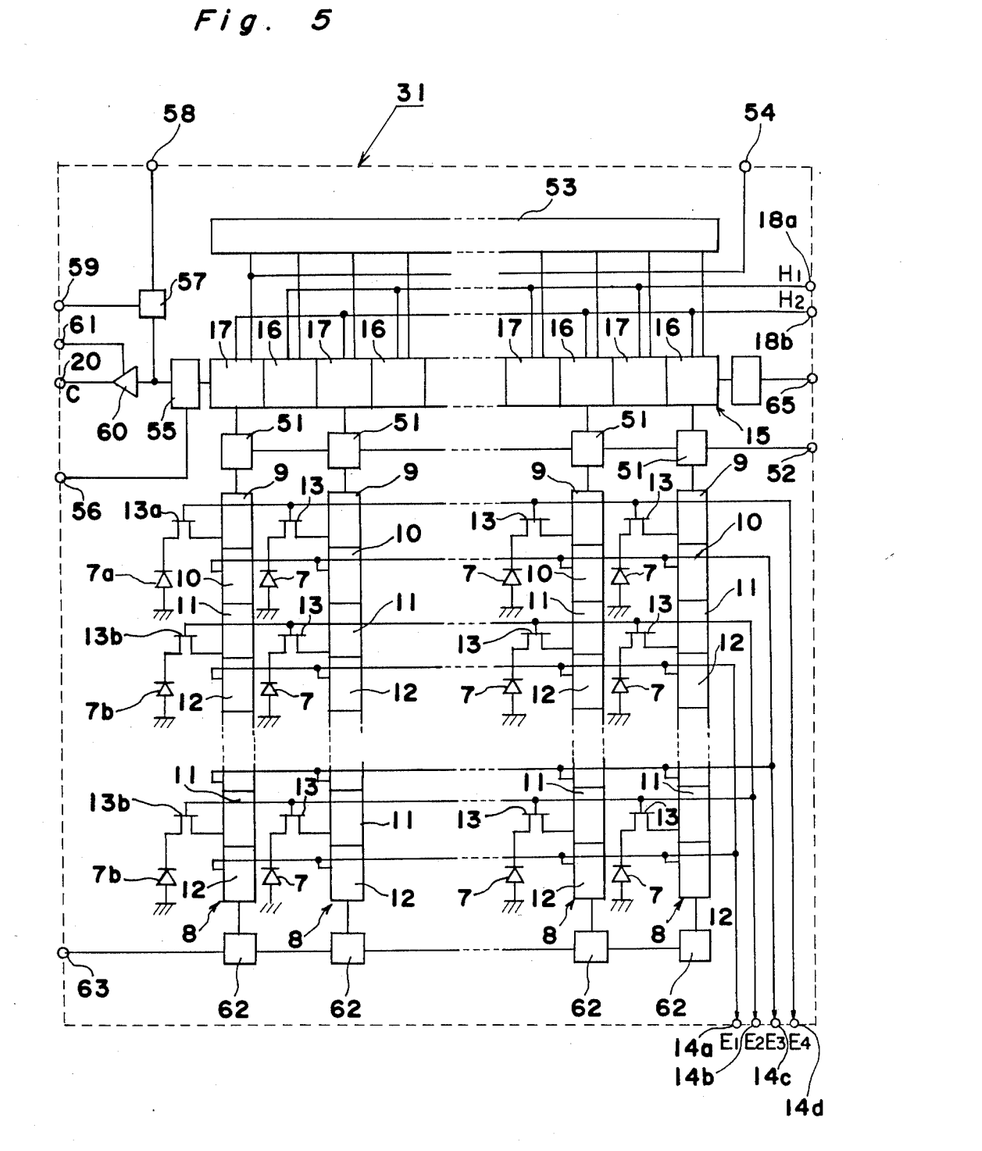
FIG. 5 is a circuit diagram of an IL-CCD used in the video camera of FIG. 4.

Referring to FIG. 5, a detail of IL-CCD 31 is shown. A plurality of photodiodes 7, are aligned vertically and horizontally. For example, in the NTSC system, there are 525 photodiodes aligned vertically, and 420 photodiodes aligned horizontally. Data transfer registers 8 are provided correspondingly to the columns of the photodiode arrays so as to vertically shift the data of accumulated charge in the photodiodes, through end gates 51, to a shift register 15, which is provided for scanning the data line by line. The inputs of shift registers 8 are connected to input sources 62 which receives source voltage from terminal 63. Each shift register 8 is defined by the repetition of cells 9, 10, 11 and 12 in which cells 9 and 11 are connected to photodiodes 7 through switching transistors 13. The gate structure of cells 9 and 11 are identical to each other, and the gate structure of cells 10 and 12 are identical to each other. The CCD is driven by signals E1, E2, E3 and E4 inputted to terminals 14a, 14b, 14c and 14d. A line for transmitting signal E4 is connected to transistor 13a and cell 9; a line for transmitting signal E3 is connected to cell 10; a line for transmitting signal E2 is connected to transistor 13b and cell 11; and a line for transmitting signal E1 is connected to cell 12.

End gates 51 are driven by a gate drive pulse applied thereto from terminal 52 and are provided for the purpose of buffer so as to enable the rapid transfer of data from shift register 8 to shift register 15.

Shift register 15 is defined by cells 16 and 17 aligned alternately and is driven by horizontal drive pulses H1 and H2 connected to cells 16 and 17, respectively. According to the preferred embodiment, shift register 15 is coupled to an over-flow drain 53 which receives, upon receipt of a control signal from terminal 54, the charges which can not be held in each cell of shift register 15 when the rapid transfer of data is effected.

The input of shift register 15 is connected to an input source 64 which receives voltage from terminal 65. The output of shift register 15 is connected to a charge detector, which is defined by a charge detecting portion 55 which receives a gate voltage from terminal 56 and changes the charge signal to a voltage signal, a reset gate 57 which receives a drain voltage from terminal 58 and a reset signal from terminal 59, and an amplifier 60 which receives a drain voltage from terminal 61. The transfer efficiency of charge detecting portion 55 is determined by the gate voltage applied from terminal 56. The charge detector produces the image signal C which is outputted from terminal 20.

Figure 6:
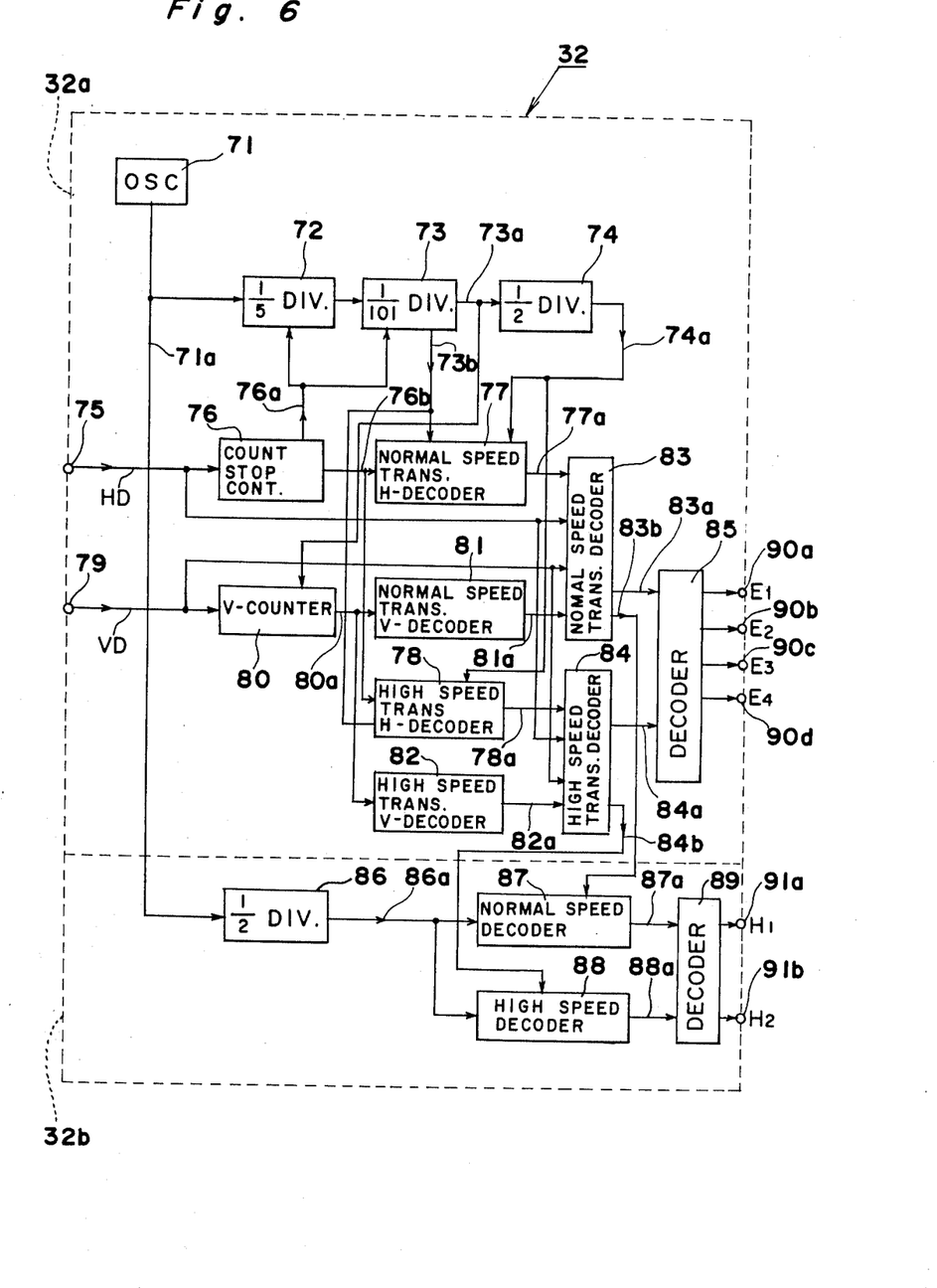
FIG. 6 is a block diagram showing the detail of CCD drive circuit used in the video camera of FIG. 4.

Referring to FIG. 6, vertical drive circuit 32a comprises an oscillator 71 which generates clock pulse at a frequency of, e.g., 15.8916 MHz. The clock pulse is applied to 1/5 frequency divider 72, 1/101 frequency divider 73 and ½ frequency divider 74. A count stop control 76 is provided which receives a horizontal scan reference signal HD from terminal 75, and produces a stop signal 76a for stopping the operation of 1/5 frequency divider 72 and 1/101 frequency divider 73 during the horizontal scan period. This is to prevent the signals from dividers 72 and 73 from adversely affecting the other signals during the horizontal scan period. The signal 73b produced from 1/101 frequency divider 73 and the signal 76b produced from count stop control 76 are applied to a normal speed transfer horizontal decoder 77 to produce a normal speed transfer horizontal decoded signal 77a. Also, the signal 73b produced from 1/101 frequency divider 73 and the signal 76b produced from count stop control 76 are applied to a high speed transfer horizontal decoder 78 to produce a high speed transfer horizontal decoded signal 78a. A vertical counter 80 is provided which receives a vertical scan reference signal VD, and produces a V-counter signal 80a. Signal 80a is applied to a normal speed transfer vertical decoder 81, which then produces a normal speed transfer vertical decoded signal 81a, and also to a high speed transfer vertical decoder 82, which then produces a high speed transfer vertical decoded signal 82a.

A normal speed transfer decoder 83 is provided which receives horizontal scan reference signal HD, vertical scan reference signal VD, normal speed transfer horizontal decoded signal 77a and normal speed transfer vertical decoded signal 81a, and produces normal speed transfer decoded signals 83a and 83b. It is to be noted that normal speed transfer decoded signal 83a is a parallel 6-bit signal used for making pulses 40a, 40b, 40c, 40d, 37, 37', 38 and 38', which are shown in FIG. 7 or 3.

A high speed transfer decoder 84 is provided which receives horizontal scan reference signal HD, vertical scan reference signal VD, high speed transfer horizontal decoded signal 78a and high speed transfer vertical decoded signal 82a, and produces high speed transfer decoded signals 84a and 84b. It is to be noted that high speed transfer decoded signal 84a is a parallel 6-bit signal used for making pulses 41a, 41b, 41c, 41d, 36, 36', 39 and 39', which are shown in FIG. 7.

Normal speed transfer decoded signal 83a and high speed transfer decoded signal 84a are applied to decoder 85, thereby producing CCD drive signals E1, E2, E3 and E4 from output terminals 90a, 90b, 90c and 90d. The CCD drive signals E1 to E4 are applied to terminals 14a to 14d of FIG. 5.

Figure 7:
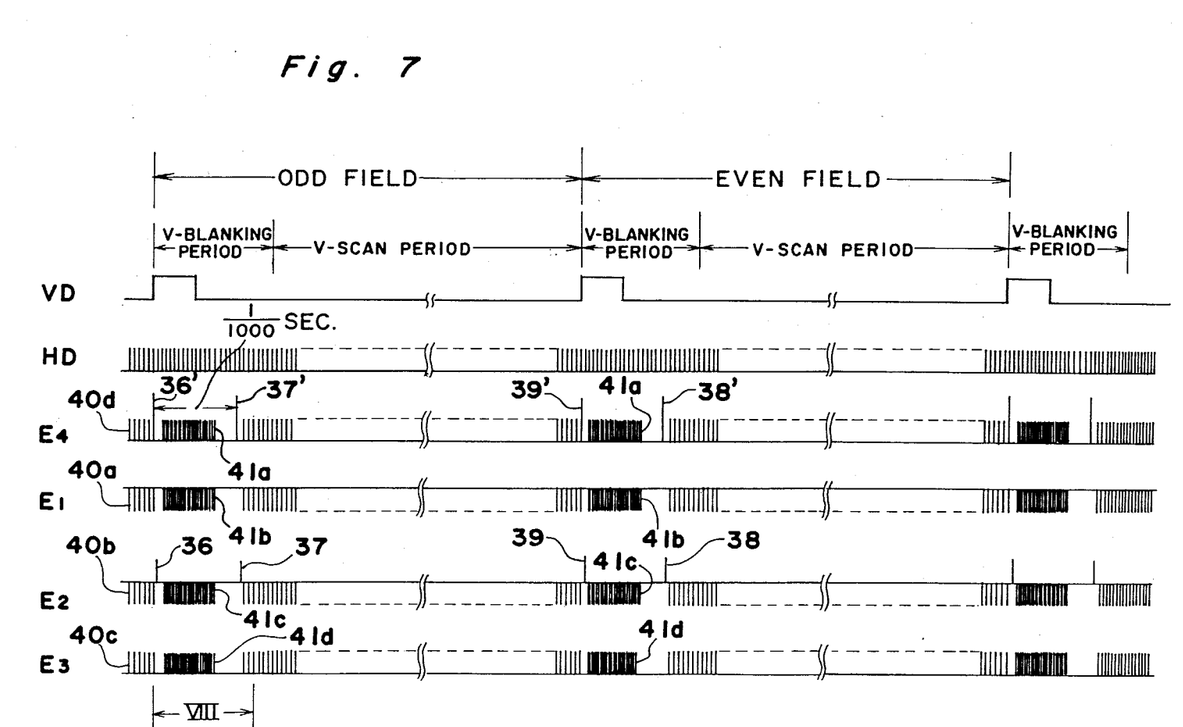
FIG. 7 is a graph of waveforms showing the operation of the IL-CCD of FIG. 4 driven by the driver of FIG. 6.

As shown in FIG. 7, signal E4 takes three different levels, the zero or reference level, the high level as in vertical drive pulses 40d and 41d, and the extra-high level as in read pulses 36', 37', 39' and 38'. By any one of the extra-high level read pulses, such as 36', transistor 13a turns on to move the charge accumulated in photodiode 7a to cell 9, thereby reading the image data in photodiodes 7 to registers 8. Then, by the high level V-drive pulse 41d, the data stored in cell 10 is shifted in the vertical direction to cell 9.

Signal E1 takes two levels, the reference level and the low level as in negative going V-drive pulses 40a and 41a, which effect the transfer of data to cell 12 from the cell behind it, i.e., cell 9.

Signal E2 takes three levels, the reference level, the high level and the low level. By any one of the high level read pulses 36, 37, 39 and 38, transistor 13b turns on to move the charge accumulated in photodiode 7b to cell 11, and by the negative going V-drive pulses 40b and 41b, the data stored in cell 12 is shifted to cell 11.

Signal E3 takes two level, the reference level and the high level as in V-drive pulses 40c and 41c. By the V-drive pulses 40c and 41c, the data stored in cell 11 is shifted to cell 10.

From the practical viewpoint, the reference levels of signals E1 and E2 and the high levels of signals E3 and E4 are set at the same level.

In addition to the above, output signal 71a of oscillator 71 is applied to a ½ frequency divider 86 for dividing the frequency into half, and its output signal 86a is applied to a normal speed transfer decoder 87. Also applied to normal speed transfer decoder 87 is a normal transfer decoded signal 83b, thereby obtaining a normal transfer decoded signal 87a. This signal is used for making a horizontal transfer pulse 42, which will be described later. The output 86a of ½ frequency divider 86 and high speed transfer decoded signal 84b are applied to high speed transfer decoder 88, thereby producing a high speed transfer decoded signal 88a. This signal is used for generating a drain setting pulse 43 which will be described later in connection with FIG. 11.

Normal speed transfer decoded signal 87a and high speed transfer decoded signal 88a are applied to decoder 89, thereby producing from output terminals 91a and 91b horizontal transfer pulses H1 and H2. The horizontal transfer pulses H1 and H2 are applied to terminals 18a and 18b, respectively.

Next, the operation of the high shutter speed video camera of the present invention will be described.

Figure 8:
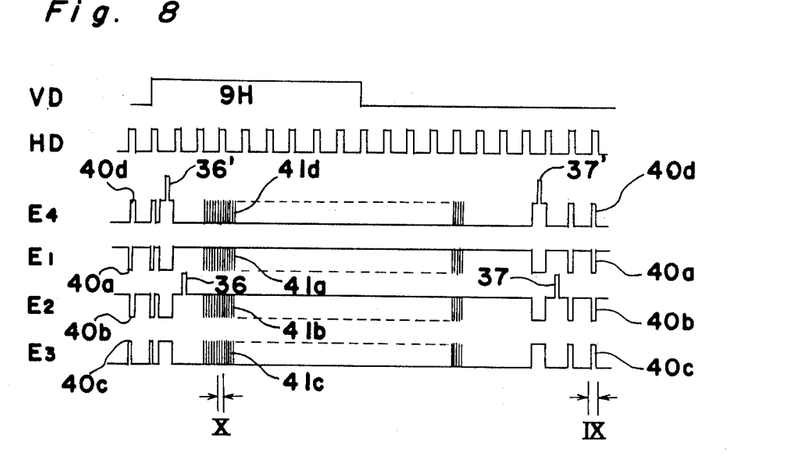
FIG. 8 is a graph of waveforms showing the detail of section VIII shown in FIG. 7 in an enlarged scale.

First, at the beginning of one field, for example, at the beginning of the odd field shown in FIG. 7, read pulses 36' and 36 are produced in said order from terminals 90d and 90b, respectively, in a predetermined timed relationship with the leading edge of vertical scan reference signal VD. The detail of section VIII indicated in FIG. 7 is shown in FIG. 8. The read pulses 36' and 36 are prepared particularly by high speed transfer decoder 84 and its associated circuits. In response to read pulse 36', switching transistors 13a (FIG. 5) are turned on to move the charges accumulated in photodiodes 7a to cells 9. Similarly, in response to read pulse 36, switching transistors 13b are turned on to move the charges accumulated in photodiodes 7b to cells 11. Thus, all the photodiodes 7 are discharged, ready for the new accumulation of charges from the zero level after the read pulses 36 and 36'. According to the present invention, since no mechanical shutter is provided, the new accumulation starts immediately after the diodes are discharged, i.e., after read pulses 36 and 36' are produced.

Thereafter, a high speed transfer mode operation takes place in which high speed vertical drive pulses 41a, 41b, 41c and 41d at a frequency, for example, 800 KHz, which is higher than horizontal scan reference signal HD, are applied to terminals 14a, 14b, 14c and 14d, respectively. The timing for start producing the high speed vertical drive pulses is determined, for example, by counting the number of horizontal scan reference signal HD produced after the leading edge of vertical scan reference signal VD. According to the example shown in FIG. 8, the high speed vertical drive pulses are produced after counting three horizontal scan reference signals HD.

Figure 10:
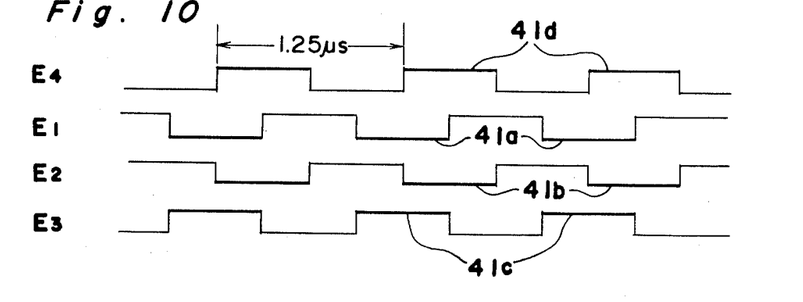
FIG. 10 is a graph of waveforms showing the detail of section X shown in FIG. 8 in an enlarged scale.

The detail of section X of the high speed vertical drive pulses indicated in FIG. 8 is shown in FIG. 10. As apparent from the drawings, vertical drive pulses 41a and 41b are shown as negative going pulses, and vertical drive pulses 41c and 41d are shown as positive going pulses. Also, as apparent from FIG. 10, the phase of pulses 41a and 41c is different from that of pulses 41b and 41d. Accordingly, the charges in cells 9 and 11 move to cells 12 and 10, and in turn move to 9 and 11, towards shift register 15 through gates 51. Under the high speed transfer mode, the signal produced from gate 51 will not be used. Since the charges move very fast under the high speed transfer mode of operation, shift register 15 can be filled to the maximum very quickly. Thus, over-flow drain 53 is provided to received the excess charges. Instead of moving the charges in shift registers 8 towards shift register 15, it is possible to move the charges in the opposite direction.

When a predetermined number of vertical drive pulses are produced for each of 41a, 41b, 41c, and 41d, to move the charges completely out from shift registers 8, next read pulses 37' and 37 are produced in said order from terminals 90d and 90b, respectively, in a similar manner to read pulses 36' and 36. In this case, read pulses 37 and 37' are prepared particularly by normal speed transfer decoder 83 and its associated circuits. When read pulses 37 and 37' are produced, the charge accumulated in photodiodes 7 are shifted to corresponding cells in shift registers 8.

According to the preferred embodiment of the present invention, a time interval between read pulses 36' and 37', or 36 and 37, is selected to be approximately equal to 1/1000 second. Thus, during this period, the high speed transfer is carried out and, at the same time, photodiodes are charged. Since the charge accumulation ends at the end of 1/1000 second, it can be said that the charge is effected at the shutter speed of 1/1000 second. It is to be noted that the speed 1/1000 can be changed to other times. The timing for start producing the read pulses 37' and 37 is determined, for example, by counting the number of horizontal scan reference signal HD produced after the leading edge of vertical scan reference signal VD, or by counting the number of clock pulses after the generation of read pulses 36' and 36.

After read pulses 37' and 37 are produced, a normal speed transfer mode operation takes place in which normal speed vertical drive pulses 41a, 41b, 41c and 41d at the frequency equal to horizontal scan reference signal HD are applied to terminals 14a, 14b, 14c and 14d, respectively.

Figure 9:
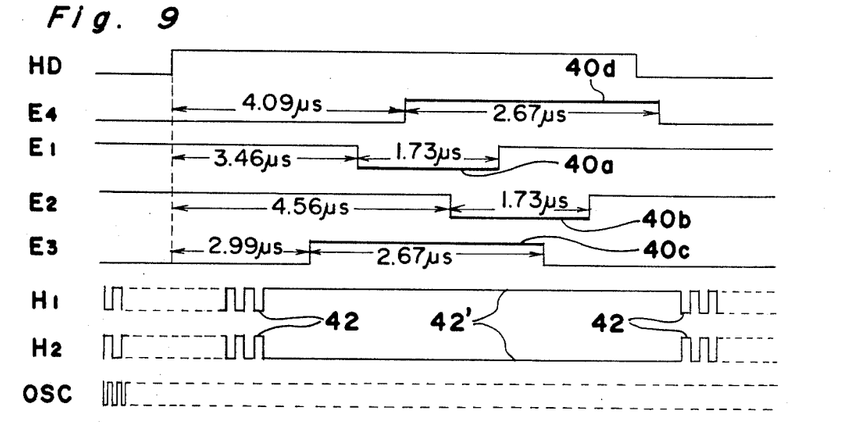
FIG. 9 is a graph of waveforms showing the detail of section IX shown in FIG. 8 in an enlarged scale.

The detail of section IX of the normal speed vertical drive pulses indicated in FIG. 8 is shown in FIG. 9. As apparent from the drawings, vertical drive pulses 40a and 40b are shown as negative going pulses, and vertical drive pulses 40c and 40d are shown as positive going pulses. Also, as apparent from FIG. 9, the phase and pulse width of pulses 41a to 41d are different so as to move the charges in cells 9 and 11 not all at once, but in the sequentially controlled manner. The charges moved to the upper most row in CCD are further moved to shift register 15 through gates 51. Then, before the next drive pulses 40a to 40d come, the charges in shift register 15 are shifted towards charge detecting portion 55 by horizontal drive pulses H1 and H2, thereby producing an image signal C from output terminal 20.

As shown in FIG. 9, each of horizontal drive pulses H1 and H2 is defined by a train of pulses 42 and skip period 42'. Skip period 42' appears when vertical drive pulses 40a, 40b, 40c and 40d are present, thereby preventing the vertical drive pulses from being interfered by horizontal drive pulses 42.

The charge as detected by charge detecting portion 55 is reset every after each frame by the reset signal applied from terminal 59 to reset gate 57, and, thereafter, it is transferred to output amplifier 60. It is to be noted that the drain voltage applied to terminal 58 is so selected as to provide an optimum transfer efficiency of signal from reset gate 57 to output amplifier 60. It is also to be noted that the transfer efficiency of shift registers 8 is determined by the voltage applied to input sources 62 from terminal 63, and the transfer efficiency of shift register 15 is determined by the voltage applied to input source 64 from terminal 65.

When a predetermined number of vertical drive pulses 40a, 40b, 40c and 40d are produced, the charges in shift registers 8 are completely moved out to shift register 15, and thus producing an image signal of one frame from terminal 20.

Next, read pulses 39' and 39 are produced, and then the high frequency pulses 41a to 41d are produced, thereby repeating the high speed transfer mode operation in the same manner described above.

Figure 11:
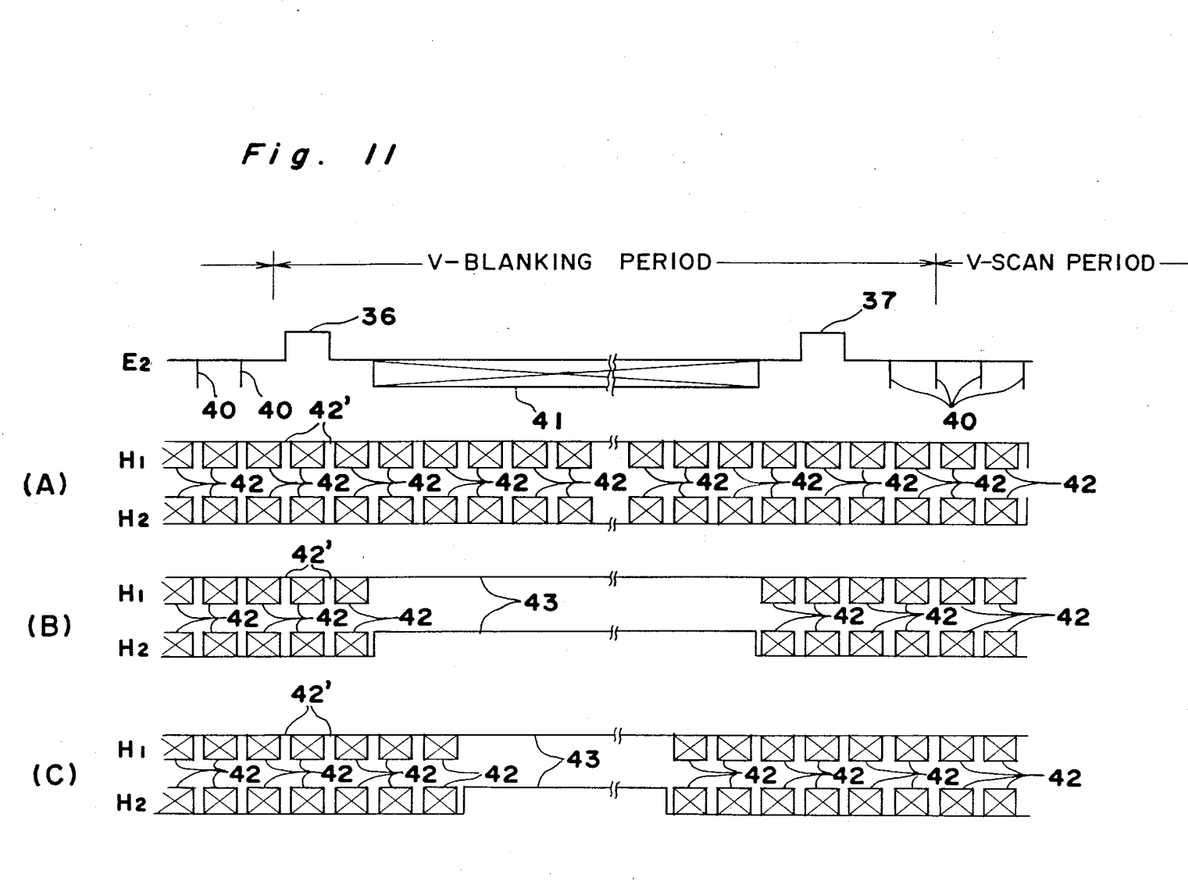
FIG. 11 is a graph of waveforms particularly showing the H-drive pulses in different modifications.

Referring to FIG. 11, horizontal drive pulses H1 and H2 are shown in which the train of pulses 42 are indicated by a block having an X depicted inside each block.

The horizontal drive pulses H1 and H2 comprises, during a period other than a vertical blanking period, a repeating pattern of a drive pulse existing period 42 inserted between the normal speed vertical drive pulses 40a, 40b, 40c and 40d and a drive pulse skip period 42' inserted while the normal speed vertical drive pulses are present. During the vertical blanking period, the same repeating pattern as that described above may be employed, as shown in FIG. 11, waveform (A). Thus, it can be said that waveform (A) shows a case in which the pulse block 42 and skip period 42' are repeated alternately even during the high speed transfer mode operation.

According to a modification, horizontal drive pulses H1 and H2 may be so arranged to insert a drain period 43 during the vertical blanking period. The drain period 43 may be prepared by providing at least one horizontal drive pulse which has its pulse width prolong so as to continuously move the transferred charge signals in shift register 15. It is possible that the drain period 43 continues entirely during when the high speed vertical drive pulses 41a, 41b, 41c and 41d are present, as shown by waveform (B), or partly within a period when the high speed vertical drive pulses 41a, 41b, 41c and 41d are present, as shown by waveform (C).

Thus, it can be said that waveform (B) shows a case when the pulse block 42 and skip period 42' are not repeated alternately during the high speed transfer mode operation, but instead, a HIGH level signal is provided constantly for the drive pulse H2, and no pulse is provided for the drive pulse H1. In this case, shift register 15 operates as a drain, so that the charge shifted to shift register 15 can be moved to voltage detecting portion 55 at a rate faster than the case shown by waveform (A).

According to the present invention, instead of IL-CCD, it is possible to employ a frame transfer charge coupled type solid state image sensor.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A high shutter speed video camera comprising:
   an objective lens;
   an image sensor means comprising:
   a photosensor array means for receiving an image formed by said objective lens, and for producing charge signals representing the image formed thereon; and
   a first shift register means for storing said charge signals, and for moving said charge signals in a predetermined direction in response to vertical drive pulses; and
   a means for producing a first read pulse signal for effecting a transfer of said charge signals from said photosensor array means to said first shift register means;
   a means for producing high speed vertical drive pulses for moving said charge signals in said first shift register means at a high speed until said charge signals are removed from said shift register means; and
   a means for producing a second read pulse signal for effecting a transfer of said charge signals from said photosensor array means to said first shift register means,
   said first read pulse signal, high speed vertical drive pulses, and second read pulse signal being produced in that order within every vertical blanking period.

2. A high shutter speed video camera as claimed in claim 1, further comprising a means for producing normal speed vertical drive pulses having a frequency lower than that of said high speed vertical drive pulses for moving said charge signals in said first shift register means at a normal speed until said charge signals are removed from said first shift register means, said normal speed vertical drive pulses being produced after said second read out signals.

3. A high shutter speed video camera as claimed in claim 2, wherein a time interval between said first and second read pulse signal with said high speed vertical drive pulses contained therebetween is approximately equal to 1/1000 seconds.

4. A high shutter speed video camera as claimed in claim 2, wherein said first and second read pulse signals are inserted in horizontal blanking periods within a vertical blanking period.

5. A high shutter speed video camera as claimed in claim 2, further comprising: a second shift register means, provided in said image sensor means, for storing said charge signals transferred from said first shift register means, and for moving said transferred charge signals in response to a scan signal; and a second driver means for producing said scan signal.

6. A high shutter speed video camera as claimed in claim 5, wherein said scan signal comprises, during a period other than a vertical blanking period, a repeating pattern of a drive pulse existing period inserted between said normal speed vertical drive pulses and a drive pulse skip period inserted while said normal speed vertical drive pulses are present.

7. A high shutter speed video camera as claimed in claim 5, further comprising an over-flow drain coupled to said second shift register means.

8. A high shutter speed video camera as claimed in claim 5, further comprising a signal processing means for forming a television signal based on said charge signals produced from said second shift register means.

9. A high shutter speed video camera comprising:
   an objective lens;
   an image sensor means comprising:
   a photosensor array means for receiving an image formed by said objective lens, and for producing charge signals representing the image formed thereon; and
   a first shift register means for storing said charge signals, and for moving said charge signals in a predetermined direction in response to vertical drive pulses; and
   a first driver means for sequentially producing: a first read pulse signal for effecting the transfer of said charge signals from said photosensor array means to said first shift register means; high speed vertical drive pulses for moving said charge signals in said first shift register means at a high speed until said charge signals are removed from said first shift register means; a second read pulse signal for effecting the transfer of said charge signals from said photosensor array means to said first shift register means; and normal speed vertical drive pulses having a frequency lower than that of said high speed vertical drive pulses for moving said charge signals in said first shift register means at a normal speed until said charge signals are removed from said first shift register means;
   a second shift register means, provided in said image sensor means, for storing said charge signals transferred from said first shift register means, and for moving said transferred charge signals in response to a scan signal; and a second driver means for producing said scan signals;
   and further comprising an over-flow drain coupled to said second shift register means.

* * * * *